US011024198B2

(12) United States Patent
Hara et al.

(10) Patent No.: US 11,024,198 B2
(45) Date of Patent: Jun. 1, 2021

(54) APPARATUS AND METHOD FOR ESTIMATING ACTUAL DIETARY CONTENT OF MEAL OF USER

(71) Applicant: International Business Machines Corporation, Armonk, NY (US)

(72) Inventors: Kazuhiro Hara, Kanagawa-Ken (JP); Hiroki Nakano, Shiga (JP); Hiroki Nishiyama, Chiba-Ken (JP); Ai Okada, Tokyo (JP); Tadayuki Yoshida, Kanagawa (JP); Mayumi Yoshitake, Ichikawa (JP)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 15/259,896

(22) Filed: Sep. 8, 2016

(65) Prior Publication Data

US 2018/0068585 A1    Mar. 8, 2018

(51) Int. Cl.
G09B 19/00 (2006.01)
B26B 3/02 (2006.01)
A47G 21/00 (2006.01)

(52) U.S. Cl.
CPC .......... *G09B 19/0092* (2013.01); *B26B 3/02* (2013.01); *A47G 21/00* (2013.01)

(58) Field of Classification Search
CPC .................................. G09B 19/0092
USPC ........................................ 434/127
See application file for complete search history.

(56) References Cited

U.S. PATENT DOCUMENTS

| 2008/0296380 A1* | 12/2008 | Karkanias | G06Q 10/00 235/462.01 |
| 2008/0313165 A1* | 12/2008 | Wu | G06Q 10/101 |
| 2010/0240962 A1* | 9/2010 | Contant | A47G 21/02 600/300 |
| 2012/0179665 A1* | 7/2012 | Baarman | G06F 19/3475 707/709 |

(Continued)

FOREIGN PATENT DOCUMENTS

| CN | 104200408 A | 12/2014 |
| CN | 104223901 A | 12/2014 |

(Continued)

OTHER PUBLICATIONS

Puristat. Puristat.com. "Food Combining for Better Digestion". Publically available Feb. 25, 2008. <https://web.archive.org/web/20080225131511/http://www.puristat.com/bloating/foodcombining.aspx>.*

(Continued)

*Primary Examiner* — James B Hull
(74) *Attorney, Agent, or Firm* — Patterson + Sheridan, LLP

(57) ABSTRACT

Provided are an apparatus and method for acquiring information designating a plurality of menu items provided in a meal; reading a characteristic of each of the plurality of menu items provided in the meal, from a menu item database that stores a characteristic for each menu item; generating an classification model for classifying a specified menu item from among the plurality of menu items, based on characteristics of the menu items; acquiring measurement data measured by a sensor attached to a utensil during the meal; and classifying a menu item corresponding to the measurement data, from a characteristic corresponding to the measurement data, using the classification model.

20 Claims, 6 Drawing Sheets

(56) References Cited

U.S. PATENT DOCUMENTS

| | | | | |
|---|---|---|---|---|
| 2014/0220516 A1* | 8/2014 | Marshall | ................ | G16H 20/60 |
| | | | | 434/127 |
| 2014/0312135 A1* | 10/2014 | Hyde | .................... | A47G 21/04 |
| | | | | 239/6 |
| 2014/0315162 A1 | 10/2014 | Ehrenkranz | | |
| 2014/0349257 A1* | 11/2014 | Connor | ............. | G09B 19/0092 |
| | | | | 434/127 |

FOREIGN PATENT DOCUMENTS

| | | | |
|---|---|---|---|
| CN | 105184105 | A | 12/2015 |
| JP | H0824798 | A | 1/1996 |
| JP | H09328109 | A | 12/1997 |
| JP | H10194222 | A | 7/1998 |
| JP | 2004008608 | A | 1/2004 |
| JP | 2005201533 | A | 7/2005 |
| JP | 2011024956 | A | 2/2011 |
| JP | 2015112929 | A | 6/2015 |

OTHER PUBLICATIONS

Smart fork and spoon Spün measure how much you eat—when to quit, http://www.today.com/food/smart-fork-spoon-sp-n-measure-how-much-you-eat-t84951.

* cited by examiner

APPARATUS AND METHOD FOR ESTIMATING ACTUAL DIETARY CONTENT OF MEAL OF USER

BACKGROUND

1. Technical Field

The present invention relates to an apparatus and a method for estimating the actual dietary content of a meal of a user.

2. Related Art

Understanding the dietary content of a meal of a user is helpful for maintaining or improving dietary habits at a personal level, and makes it possible to gather data relating to the health of each user. Conventionally, such dietary content of a meal of a user has been understood by recording a menu of meals based on the memory of the user, capturing images in eating environments of the user, and the like. Furthermore, techniques are known for identifying specific components of food using a sensor or the like.

However, even using the same menu, the actual ingredients and amounts that are portioned out differ according to the preferences, hunger, heath state, and feelings of each individual, and therefore it is difficult to understand the dietary content actually eaten by the user. Furthermore, it is difficult to understand the order in which menu items are eaten by the user, unless a complex and work-intensive apparatus that analyzes moving images of the eating environment is used, for example.

SUMMARY

According to a first aspect of the present invention, provided is an apparatus comprising a processor and one or more computer readable mediums collectively including instructions that, when executed by the processor, cause the processor to: acquire information designating a plurality of menu items provided in a meal; read a characteristic of each of the plurality of menu items provided in the meal, from a menu item database that stores a characteristic for each menu item; generate an classification model for classifying a specified menu item from among the plurality of menu items, based on characteristics of the menu items; acquire measurement data measured by a sensor attached to a utensil during the meal; and classify a menu item corresponding to the measurement data, from a characteristic corresponding to the measurement data, using the classification model.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
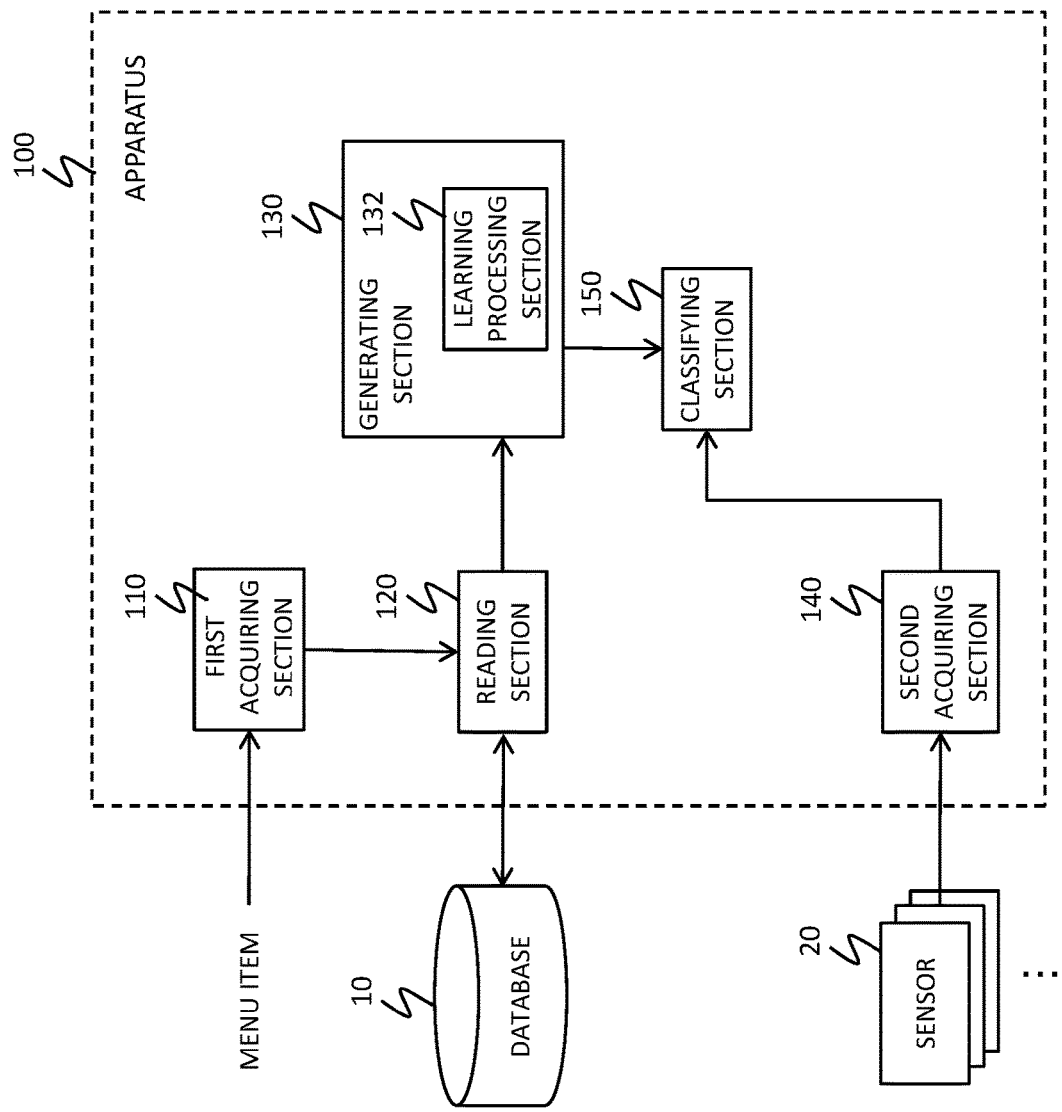
FIG. 1 shows an exemplary configuration of an apparatus 100 according to an embodiment, along with a menu item database 10 and a sensor 20.

FIG. 1 shows an exemplary configuration of an apparatus 100 according to an embodiment, along with a menu item database 10 and a sensor 20. The menu item database 10 may be operable to store information of menu items forming a meal menu of the user. The menu item information may be information for each of a plurality of food items such as steak, pizza, pie, stew, sushi, and the like. Instead of this or in addition to this, the menu item information may be information for each of a plurality of ingredients such as carrots, sausage, cheese, and the like.

The menu item database 10 may be operable to store characteristics of each menu item. The menu item database 10 may store, as the characteristics of the menu items, ingredients, recipes, nutritional content, expected values for measurement by the sensor 20, past measurement results by the sensor 20, and/or the like of the menu items. The menu item database 10 may be operable to register the characteristics and the like of the menu items using the apparatus 100.

The sensor 20 may be operable to measure the characteristics of the menu items, by being attached to a utensil used by the user. Hear, a utensil may be an object used to carry food to the mouth. Furthermore, a utensil may be a plate, bowl, saucer, or the like holding food. The sensor 20 may be operable to measure the characteristics and amounts of the menu items that the user has eaten during a meal. The sensor 20 may be attached to a utensil that is used by the user during meals. The sensor 20 may be attached to a utensil that is used when cooking a menu item.

The sensor 20 may include at least one of a salinity sensor, a sugar content sensor, a temperature sensor, an electrical resistance sensor, a warping sensor, an acceleration sensor, and a gyro sensor. A sensor 20 may be provided on each of a plurality of utensils. A plurality of types of sensors 20 may be provided on a single utensil.

The apparatus 100 may be operable to classify the menu items actually eaten by the user from among a plurality of menu items, based on the sensor information from a sensor 20 provided on a utensil used by the user during meals, for example. The apparatus 100 may be operable to learn in a manner to associate each menu item with sensing information, based on the characteristics of a plurality of menu items. The apparatus 100 includes a first acquiring section 110, a reading section 120, a generating section 130, a second acquiring section 140, and a classifying section 150.

The first acquiring section 110 may be operable to acquire information designating a plurality of menu items provided in a meal. The first acquiring section 110 may acquire information of a plurality of menu items to be eaten by the user. The first acquiring section 110 may acquire information of a plurality of menu items to be cooked by the user. The first acquiring section 110 may acquire the information of the menu items to be cooked by the user together with amounts to be cooked. For example, the apparatus 100 may display to the user a list of a plurality of menu items registered in advance, for example, and the first acquiring section 110 may acquire information that is a plurality of menu items selected by the user from the displayed list. The first acquiring section 110 may supply the reading section 120 with the acquired information.

The reading section 120 may be operable to read each characteristic of a plurality of menu items provided in a meal from the external menu item database 10. The reading section 120 may read the characteristics corresponding to the menu items acquired by the first acquiring section 110. The reading section 120 may supply the generating section 130 with the read characteristics.

The generating section 130 may be operable to generate an classification model for classifying a specified menu item from among a plurality of menu items, based on the characteristics of the menu items. The generating section 130 may generate an classification model for classifying a menu item corresponding to a measurement result of the sensor 20, from among a plurality of menu items selected by the user. The generating section 130 includes a learning processing section 132.

The learning processing section 132 may be operable to perform a learning process to classify a corresponding menu item from each of at least one characteristic in each of a plurality of menu items. The learning processing section 132 may perform the learning process based on a measurement result from the sensor 20 for each of the menu items, for example. The learning processing section 132 may supply the classifying section 150 with the learned classification model.

The second acquiring section 140 may be operable to acquire measurement data measured by the sensor 20 attached to a utensil during a meal. The measurement data may include measurement values indicating characteristics and measurement values indicating amounts of the menu items eaten by the user. The second acquiring section 140 may be connected wirelessly or with a wire to one or more sensors 20, and may receive sensing signals of the sensors 20. The second acquiring section 140 may supply the classifying section 150 with the acquired sensing signals as the measurement results.

The classifying section 150 may be operable to classify a menu item corresponding to measurement data, from characteristics corresponding to the measurement data, by using the classification model generated by the generating section 130. The classifying section 150 may classify the measurement results acquired by the second acquiring section 140 and classify the menu items in contact with the utensil to which the sensor 20 that obtained these measurement results is attached, based on the classification model generated by the generating section 130. The classifying section 150 may classify that the user has moved a menu item to their mouth, according to the measurement results. If a decrease in the weight of a menu item has been measured from before to after the time when the user moved the menu item to their mouth, the classifying section 150 may classify this amount of decrease as being the amount of the menu item eaten by the user.

The apparatus 100 according to the present embodiment described above acquires characteristics of a plurality of menu items forming a menu for a meal, generates an classification model based on the characteristics of these menu items, and classifies measurement results of the sensor 20. The apparatus 100 restricts a large number of menu items to a plurality of menu items selected as the meal menu and generates the classification model through learning by using the characteristics of the limited menu items, and therefore the apparatus 100 can accurately perform classification by using the measurement results. The operation of this apparatus 100 is described below.

Figure 2:
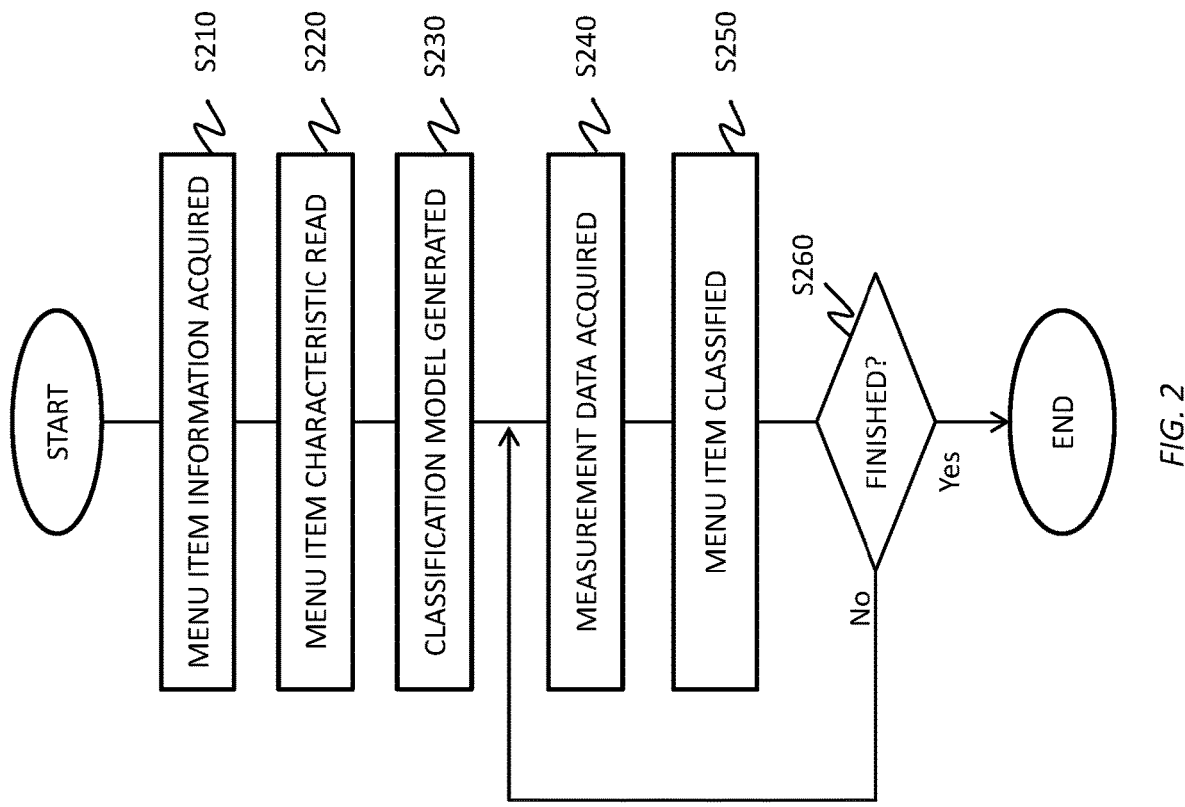
FIG. 2 shows an operational flow of the apparatus 100 according to the present embodiment.

FIG. 2 shows an operational flow of the apparatus 100 according to the present embodiment. In the present embodiment, the apparatus 100 may generate the classification model for classifying a menu item by using the measurement results of the sensor 20 by performing the processes from S210 to S260. The present embodiment is an example in which the apparatus 100 classifies a menu item based on measurement data received from a sensor 20 during a meal of the user.

First, the first acquiring section 110 may acquire information of the menu items (S210). The first acquiring section 110 may acquire information of menu items to be eaten by the user, for example. The first acquiring section 110 may acquire the information of a plurality of menu items by having the user input this information using a display, sound, a keyboard, a mouse, or the like.

The first acquiring section 110 acquires the information of the menu items, which are salad, bread, hamburg steak, and cake, for example. The acquiring section 110 may acquire information of menu items such as lettuce, onions, and carrots that are ingredients in a salad; onions and carrots that are ingredients in mashed potatoes and soup; and broccoli, potatoes, and fried onions that are sides for hamburg steak.

Next, the reading section 120 may read each characteristic of the plurality of menu items from the menu item database 10 (S220). The reading section 120 may be operable to, for each menu item, read from the menu item database 10 at least one characteristic corresponding to at least one cooking result obtained from at least one of a different chef and a different cooking instance. In this case, the first acquiring section 110 may acquire information of menu items that includes cooking methods and chefs such as the user, a family member, or a delivery service, for example.

Next, the generating section 130 may generate an classification model for classifying a specified menu item from among the plurality of menu items (S230). The generating section 130 may generate the classification model using characteristics such as the salt concentration, sugar concentration, temperature, electrical resistance, pH, weight, and the like of the menu items. If the menu items are being handled with utensils, the generating section 130 may generate the classification model further using characteristics such as warping, acceleration, weight change, angular velocity, and the like as measured by the sensor 20. Here, handling the menu items with a utensil may include portioning out, cutting up, or transporting the menu items, for example.

For example, salads, hamburg steaks, cakes, and the like have different ingredients, and therefore there are different characteristics for at least one of the salt concentration, sugar concentration, temperature, electrical resistance, and pH. Furthermore, a liquid such as a soup is usually eaten in portions of a substantially constant amount using a spoon or the like, and so it is easy for a characteristic thereof to change by an amount that is less than or equal to a constant amount. In other words, each menu item tends to have a different characteristic sensed by the sensor 20.

Even if the same ingredients are used, each menu item after being cooked differs in terms of hardness and softness, viscosity, flavor, water content, and the like. For example, sliced onions in a salad, onions put into soup, and fried onions served as a side each tend to have a different temperature, salt concentration, electrical resistance, pH, and the like. In the same manner, the characteristics tend to differ between carrots in a salad and carrots put into a soup and between mashed potatoes in a salad and mashed potatoes served as a side, for example.

Even the same menu item can have different characteristics. For example, there are different characteristics between a portion of a hamburg steak that has sauce on it and a portion of a hamburg steak that does not have sauce on it, a portion of a salad that has dressing on it and a portion of a salad that does not have dressing on it, and the like. The generating section 130 may generate the classification model for classifying each menu item from such a trend of different characteristics resulting from different menu items, a trend of substantially identical characteristics resulting from different menu items, a trend of different characteristics resulting from the same menu items, a trend of substantially identical characteristics resulting from the same menu items, and the like.

Generating an classification model for classifying all menu items from the characteristics of all menu items that could possibly be in a meal menu requires a huge amount of time and effort, and it is difficult to improve the classification accuracy in such a model. However, the generating section 130 according to the present embodiment generates the classification model using the characteristics of only a plurality of menu items forming the meal menu, and therefore it is possible to quickly generate the classification model with high classification accuracy.

Even if the user selects menu items (e.g. salad, hamburg steak, and cake) that are included in the current meal menu to be in the next meal menu, there are cases where menu items (e.g. stew) that are not included in the current meal menu are added and/or cases where menu items (e.g. soup) included in the current meal menu are omitted. In such cases, the generating section 130 may generate, as the classification model corresponding to the next meal menu, an classification model that differs from the classification model of the current meal menu.

The generating section 130 may improve the classification ability by learning. The classification model may include at least one of a support vector machine (SVM) and a neural network. The learning processing section 132 may be operable to learn such an classification model. The SVM forms a classification unit that separates data in a manner to maximize the distance between each class which includes part of the data. In this way, as long as the model is capable of separating input data, the classification model is not limited to being an SVM and may be formed by another technique or a combination of other techniques.

The learning processing section 132 may learn the classification model by using, as training data, a plurality of known menu items and measurement data of sensors 20 obtained when each of these menu items is handled with a utensil. The learning processing section 132 may generate the classification model by using characteristics of a larger number of menu items. For example, bread or the like can be torn into pieces and moved to the mouth by hand, without using a spoon or fork. Furthermore, steak is often moved to the mouth after being cut into pieces by securing the steak with a fork and sawing with a knife. Soup is often moved to the mouth in constant amounts using a spoon.

The learning processing section 132 may generate the classification model by further using characteristics such as warping, acceleration, angular velocity, and the like that are measured by the sensors 20 during actions such as the portioning out, cutting up, and moving to the mouth of these menu items. The learning processing section 132 may generate the classification model by further using an amount of a decrease in weight according to a weight sensor or the like provided in a utensil such as a plate. The learning processing section 132 can generate the classification model for classifying the menu items by using a trend of characteristics and a distribution of characteristics for each menu item. The learning processing section 132 may generate the classification model to further classify an action of moving a menu item resting on a large plate to a small plate, an action of simply moving a utensil or the like without touching a menu item, an action of reducing the weight of a menu item without touching the menu item with a utensil (e.g. an action of eating by hand), an action of moving a utensil or the like to the mouth, and the like.

Next, the second acquiring section 140 may acquire measurement data measured by a sensor 20 (S240). The classifying section 150 may classify the menu item corresponding to the measurement data from the characteristic corresponding to the measurement data, by using the classification model generated by the generating section 130 (S250). The classifying section 150 may be operable to classify, as the menu item corresponding to the measurement data, the menu item having the highest confidence rating among the plurality of menu items from the characteristic corresponding to the measurement data, by using the classification model.

If an action of moving the menu item resting on a large plate to a small plate or an action of simply moving the utensil or the like without touching the menu item has been classified, the classifying section 150 may classify that the user has not moved the menu item to their mouth. The classifying section 150 may classify a menu item on a condition that an action such as moving the utensil or the like to the mouth has been classified.

If the classifying of menu items is to continue (S260: No), the apparatus 100 may return to step S240 to acquire the next measurement data measured by the sensor 20 and classify a menu item corresponding to this next measurement data. By repeating the processes from S240 to S260, the apparatus 100 can sequentially classify the menu items that have actually been eaten during the meal of a user including a plurality of menu items.

The apparatus 100 may end the classifying of menu items (S260: Yes) in response to a designation by the user, detection of the end of the meal, passage of a predetermined time, or the like. The classifying section 150 may output the results of the specifications to the outside. The classifying section 150 may store the results of the specifications in an external database or the like. In the manner described above, with the apparatus 100 according to the present embodiment, the generating section 130 generates the classification model for classifying menu items according to the characteristics of these menu items, and therefore it is possible to classify the menu item with the highest confidence rating by simply applying the measurement results of the sensor 20 to this classification model.

Figure 3:
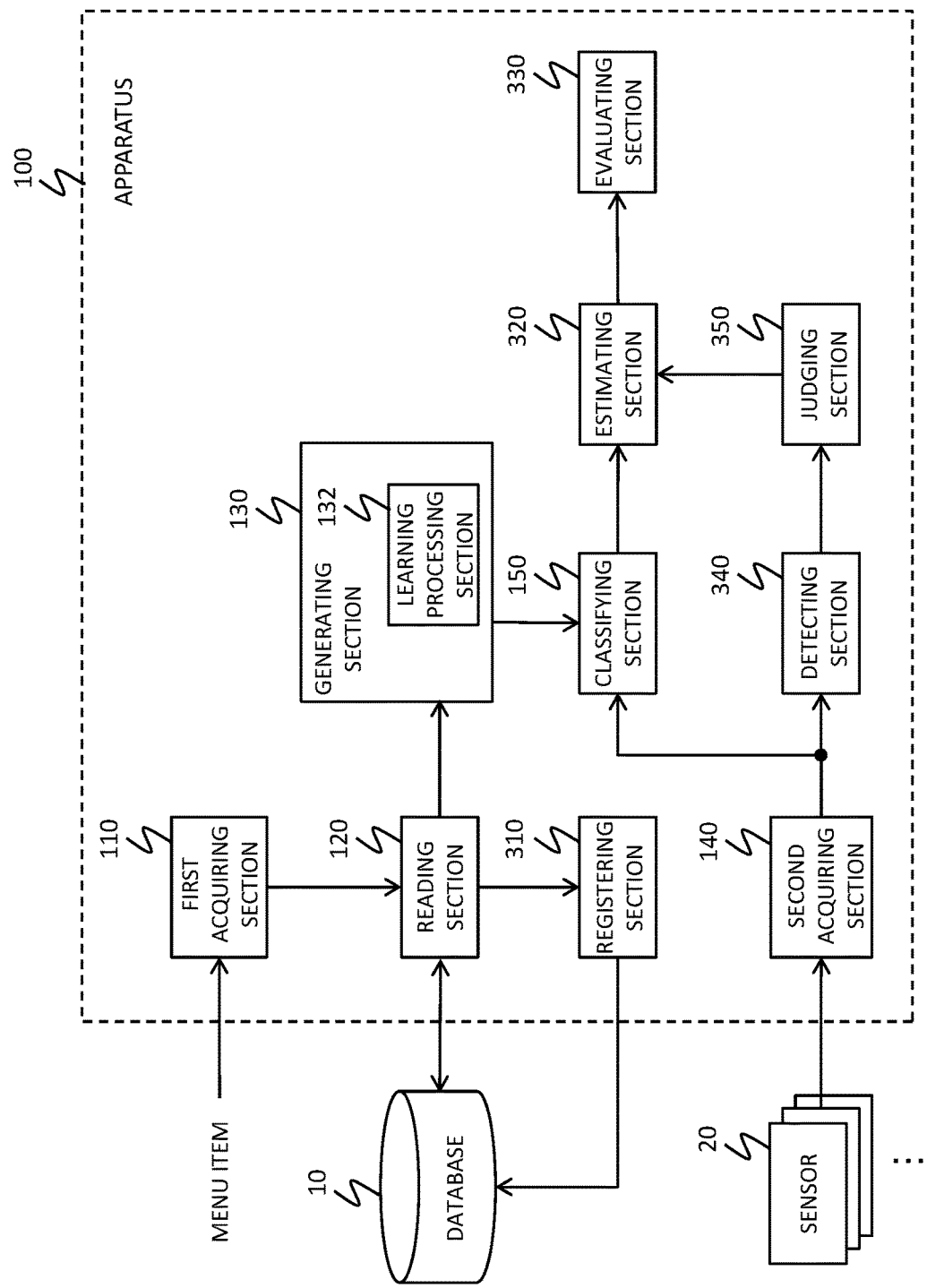
FIG. 3 shows a modification of the apparatus 100 according to the present embodiment.

FIG. 3 shows a modification of the apparatus 100 according to the present embodiment. In the apparatus 100 of the present modification, components having substantially the same operation as components in the apparatus 100 according to the embodiment shown in FIG. 1 are given the same reference numerals and descriptions thereof are omitted. The apparatus 100 of the present modification may be operable to operate together with cooking of a meal by the user. Furthermore, the apparatus 100 of the present modification may be operable to register characteristics of menu items. Yet further, the apparatus 100 of the present modification may be operable to evaluate dietary content of a meal of the user. The apparatus 100 of the present embodiment further includes a registering section 310, an estimating section 320, an evaluating section 330, a detecting section 340, and a judging section 350.

The registering section 310 may be operable to register characteristics corresponding to the measurement data in the menu item database 10. The registering section 310 may be operable to register characteristics corresponding to the measurement data in association with a new menu item that has not yet been registered in the menu item database 10, in response to the measurement data measured by a sensor 20 attached to a utensil during cooking or after cooking relating to the new menu item.

The registering section 310 may register menu items in response to a designation by the user. For example, even for the same menu item, the user may register this menu item as a different menu item in response to the chef, cooking method, flavoring, or the like being different.

The estimating section 320 may be operable to estimate the dietary content of the meal of the user, based on time-series data of the measurement data. The estimating section 320 may be operable to estimate the amount of at least one of salt, sugar, and calories ingested by the user, by using the specification results of the classifying section 150. The estimating section 320 may supply the evaluating section 330 with the estimation results.

The evaluating section 330 may be operable to evaluate the dietary content of the meal of the user, based on the estimation results of the dietary content from the estimating section 320. The evaluating section 330 may be operable to output an evaluation that includes advice relating to the order in which a plurality of menu items should be eaten. The evaluating section 330 may output the evaluation results using audio and/or a display, or may store the evaluation results in an internal or external storage medium or the like. The evaluating section 330 may communicate with a device such as a portable terminal possessed by the user and transmit the evaluation results to this device.

The detecting section 340 detects wither a utensil has remained stationary without moving for at least a predetermined time, using the measurement data measured by this utensil for moving food to the mouth. The detecting section 340 may detect movement of the utensil based on the measurement data of an acceleration sensor and/or gyro sensor. The detecting section 340 supplies the judging section 350 with a detection signal, in response to the user not moving the utensil for at least a threshold time, for example.

The judging section 350 may be operable to judge that the user of a utensil has finished eating, in response to the detection that the utensil has not moved for at least a predetermined time. The judging section 350 may judge that the meal has ended in response to the reception of the detection signal from the detecting section 340. The judging section 350 may end the operation of classifying menu items performed by the apparatus 100, in response to the meal being judged to be ended. The judging section 350 may notify the estimating section 320 that the meal has been judged to be ended.

Figure 4:
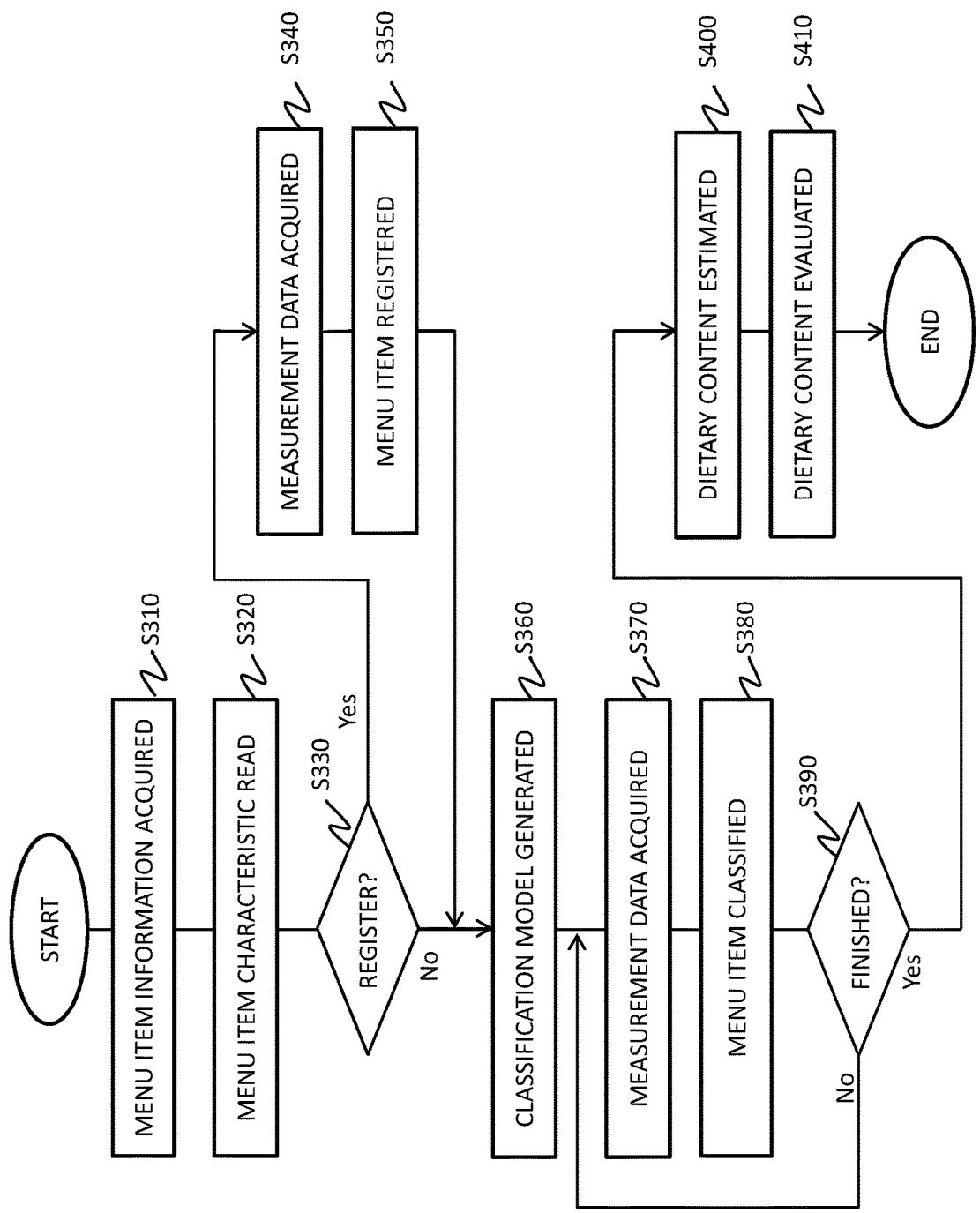
FIG. 4 shows an operational flow of the apparatus 100 according to the present modification shown in FIG. 3.

The following described the operation of the apparatus 100 according to the present modification described above. FIG. 4 shows an operational flow of the apparatus 100 according to the present modification shown in FIG. 3. By performing the processes from S310 to S410, the apparatus 100 of the present embodiment may begin operating when the cooking of the meal begins, register a new menu item, and/or evaluate the dietary content after the meal. In the description of the operation of the apparatus 100 of the present embodiment, operations that are the same as those of the apparatus 100 according to the embodiment described in FIG. 2 are omitted.

First, the first acquiring section 110 may acquire the information of a menu item (S310). The first acquiring section 110 may acquire the information of a menu of meals that are to be cooked and eaten by the chef.

Next, the reading section 120 may read the recipes and characteristics of each of a plurality of menu items from the menu item database 10 (S320). The apparatus 100 may display the recipes of the menu items read by the reading section 120. The chef may proceed with the cooking according to the recipes.

Here, if the amount of an ingredient that has been prepared is different from the amount of the ingredient in the displayed recipe, the chef may update and register the information of this menu item, or may instead register the information of this menu item independently. If the ingredients that were prepared are different from the ingredients in the displayed recipe, the chef may register a new menu item. If a menu item selected by the chef could not be read from the menu item database 10 by the reading section 120, the apparatus 100 may register this menu item in the menu item database 10 as a new menu item.

If a menu item is being registered (S330: Yes), the chef may handle the ingredients using a utensil to which a sensor 20 is attached, so that the measurement data of the sensor 20 is acquired from the second acquiring section 140 (S340). In other words, the second acquiring section 140 may be operable to acquire the measurement data measured by the sensor 20 attached to the utensil during cooking or after cooking. The registering section 310 may register the characteristics corresponding to the measurement data acquired by the second acquiring section 140, in association with the new menu item that is to be registered (S350). In this way, the apparatus 100 can register the characteristics of the menu item in the menu item database 10 using the ingredients that are to be used in the actual cooking.

If a menu item is not being registered (S330: No) or if registration has been completed, the chef may continue cooking the menu items. When the chef has finished cooking and preparation of the meal menu has been completed, the generating section 130 may generate the classification model for classifying specified menu items from among a plurality of menu items (S360).

Next, the second acquiring section 140 may acquire the measurement data measured by the sensor 20 (S370). The classifying section 150 may classify a menu item corresponding to the measurement data, from the characteristic corresponding to the measurement data, using the classification model generated by the generating section 130 (S380). The processes from the generation of the classification model to the specification of a menu item have been described with reference to FIG. 2, and are therefore not described here.

If the specification of menu items is to continue (S390: No), the apparatus 100 may return to step S370, acquire the next measurement data measured by the sensor 20, and classify a menu item corresponding to this next measurement data. By repeating the processes from S370 to S390, the apparatus 100 may sequentially designate menu items that have actually been eaten, in accordance with the progression of a meal of the user including a plurality of menu items. In this way, the classifying section 150 can accumulate time-series data of the measurement data and information of the menu items specified in correspondence with this time-series data.

The apparatus 100 may end the specification of menu items (S390: Yes) in response to a designation by the user, detection of the end of the meal, passage of a predetermined time, or the like. The detection of the end of the meal may be performed by the detecting section 340 and the judging section 350. Specifically, the detecting section 340 may supply the judging section 350 with a detection signal in response to the user not moving the utensil for at least a threshold time. The judging section 350 may judge that the meal has ended and end the specification operation of the classifying section 150, in response to receiving the detection signal from the detecting section 340. Furthermore, the judging section 350 may notify the estimating section 320 about the end of the meal to cause the estimating section 320 to begin the estimating operation.

When the operation of classifying menu items performed by the apparatus 100 is finished, the estimating section 320 may estimate the dietary content of the meal of the user by using the time-series data of the measurement data accumulated by the classifying section 150 and the information of the menu items specified in correspondence with this time-series data (S400). The estimating section 320 may estimate the amounts of salt, sugar, nutritional content, calories, dietary fiber, and the like ingested by the user in the current meal. The estimating section 320 may estimate the amount of each menu item ingested by the user.

Next, the evaluating section 330 may evaluate the dietary content of the meal of the user, based on the estimation results of the estimating section 320 (S410). The evaluating section 330 may display the estimation results to the user. The evaluating section 330 may display the estimation results to the user together with advice for future meals. The evaluating section 330 may provide advice concerning the order in which a plurality of menu items should be eaten, such as "eat menu items that contain a large amount of dietary fiber earlier in the meal, and eat menu items that contain a large amount of carbohydrates later in the meal." The evaluating section 330 may provide feedback, such as more preferable eating times, together with the eating times of the user.

The evaluating section 330 may store the evaluation results together with the estimation results of the estimating section 320 in a storage medium or the like. The evaluating section 330 may accumulate evaluation results for each of a plurality of users. The evaluating section 330 may accumulate evaluation results in an external storage apparatus such as the cloud, and may perform further analysis using another analysis apparatus or the like. As described above, the apparatus 100 according to the present embodiment can update and register characteristics of menu items according to the cooking of a chef, and can therefore more accurately classify menu items.

The apparatus 100 can estimate the dietary content of an actual meal of the user, and can therefore provide the user with suitable feedback for this dietary content. Furthermore, the apparatus 100 can provide advice and perform analysis of a health state or the like of each individual person, by accumulating estimation results of the dietary content of actual meals of a plurality of users.

Figure 5:
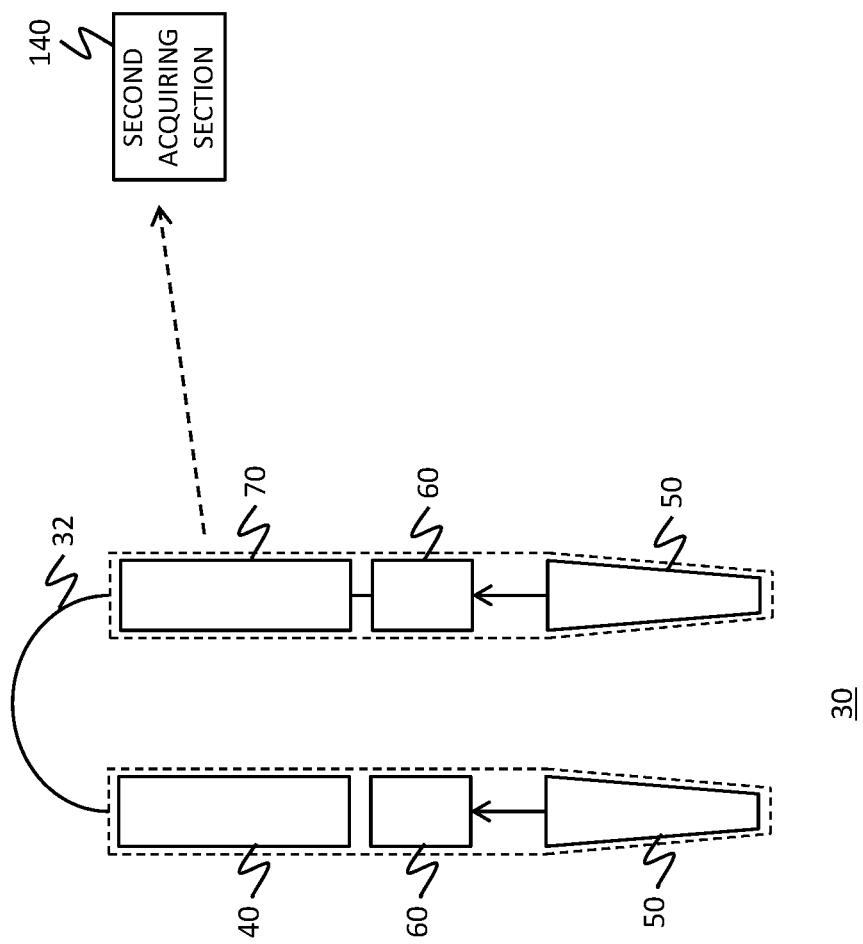
FIG. 5 shows an exemplary utensil to which a sensor 20 according the present embodiment is attached.

FIG. 5 shows an exemplary utensil to which a sensor 20 according the present embodiment is attached. The utensil is preferably at least one of a chopstick, a fork, a knife, and a spoon that is used only by a single person during a meal. In this way, the apparatus 100 can easily perform the accumulation of data for each individual. FIG. 5 shows an example in which the utensil is a pair of chopsticks 30. The chopsticks 30 include a wiring portion 32, a battery 40, sensor sections 50, receiving sections 60, and a transmitting section 70.

The wiring portion 32 may be operable to electrically connect the chopsticks to each other. The wiring portion 32 may provide a power supply from the battery 40 provided in one of the chopsticks to each component provided in the other chopstick, for example. The battery 40 may be a rechargeable battery. The battery 40 is preferably operable to be charged in a non-contact manner. The sensor sections 50 may include a plurality of sensors 20. The sensor sections 50 may be provided at the tips of the chopsticks.

The receiving sections 60 may each be operable to receive sensing signals from the plurality of sensors 20 provided in the sensor sections 50. The receiving sections 60 may include amplification circuits to amplify the sensing signals. The transmitting section 70 may be operable to transmit the sensing signals received by the receiving sections 60. The transmitting section 70 may wirelessly transmit the sensing signals to the second acquiring section 140 as the measurement data. The transmitting section 70 may be operable to communicate with the second acquiring section 140 via short-range wireless communication.

The chopsticks 30 described above can measure the characteristics of a menu item by touching the menu item. Furthermore, corresponding sensing signals are output from the acceleration sensor, gyro sensor, or the like in response to the chopsticks 30 moving, and therefore the apparatus 100 can understand the trajectory of the movement of the chopsticks 30 by accumulating and analyzing these sensing signals. Furthermore, by analyzing the information of the characteristics of the menu items from the chopsticks 30, the information concerning the movement of the chopsticks 30, and the like, the apparatus 100 can understand when a menu item is grasped and moved, when a menu item is portioned out, when a menu item is cut into smaller pieces, and the like.

Figure 6:
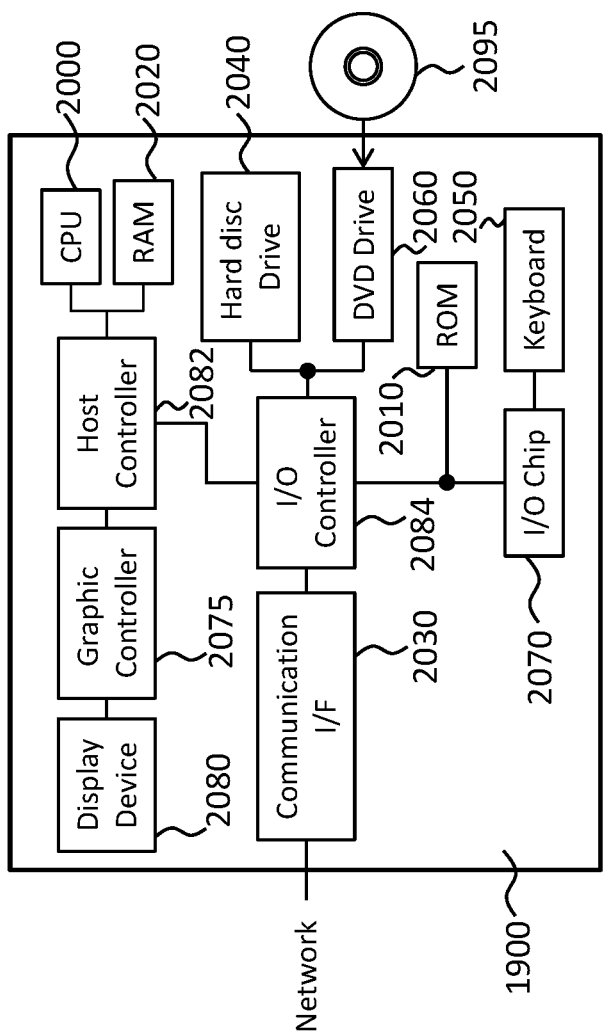
FIG. 6 shows an exemplary hardware configuration of a computer 1900 according to the embodiment of the invention.

FIG. 6 shows an exemplary configuration of a computer 1900 according to an embodiment of the invention. The computer 1900 according to the present embodiment includes a CPU 2000, a RAM 2020, a graphics controller 2075, and a display apparatus 2080 which are mutually connected by a host controller 2082. The computer 1900 also includes input/output units such as a communication interface 2030, a hard disk drive 2040, and a DVD-ROM drive 2060 which are connected to the host controller 2082 via an input/output controller 2084. The computer also includes legacy input/output units such as a ROM 2010 and a keyboard 2050 which are connected to the input/output controller 2084 through an input/output chip 2070.

The host controller 2082 connects the RAM 2020 with the CPU 2000 and the graphics controller 2075 which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 and causes the computer 1900 to function as an apparatus, such as the apparatus 100 of FIG. 1 and the apparatus 100 of FIG. 3, includes a first acquiring section, a reading section, a generating section, a second acquiring section, a classifying section, a registering section, an estimating section, an evaluating section, a detecting section, a judging section. The program or module acts on the CPU 2000, to cause the computer 1900 to function as a section, component, and element such as the first acquiring section 110, the reading section 120, the generating section 130, the second acquiring section 140, and the classifying section 150, the registering section 310, the estimating section 320, the evaluating section 330, the detecting section 340, the judging section 350 described above.

The information processing described in these programs is read into the computer 1900, to function as a first acquiring section, a reading section, a generating section, a second acquiring section, a classifying section, a registering section, an estimating section, an evaluating section, a detecting section, a judging section, which are the result of cooperation between the program or module and the above-mentioned various types of hardware resources. Moreover, the apparatus is constituted by realizing the operation or processing of information in accordance with the usage of the computer 1900.

For example when communication is performed between the computer 1900 and an external device, the CPU 2000 may execute a communication program loaded onto the RAM 2020, to instruct communication processing to a communication interface 2030, based on the processing described in the communication program. The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020 such as by DMA transfer, the file or the database having been stored in an external recording medium such as the hard disk drive 2040, the DVD-ROM drive 2060 (DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc. Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from the RAM 2020, which includes various types of operations, processing of information, condition judging, search/replace of information, etc., as described in the present embodiment and designated by an instruction sequence of programs, and writes the result back to the RAM 2020. For example, when performing condition judging, the CPU 2000 may judge whether each type of variable shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2000 may search for information in a file, a database, etc., in the recording medium. For example, when a plurality of entries, each having an attribute value of a first attribute is associated with an attribute value of a second attribute, are stored in a recording apparatus, the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product. The computer program product may include a non-transitory computer readable storage medium (or media) having computer readable program instructions thereon for causing a processor to carry out aspects of the present invention.

The non-transitory computer readable storage medium can be a tangible device that can retain and store instructions for use by an instruction execution device. The non-transitory computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the non-transitory computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, by generating an classification model for classifying menu items, the embodiment of the present invention can classify menu items corresponding to measurement data during a meal and estimate the dietary content of the actual meal of the user.

What is claimed is:

1. An apparatus for calorie estimation for a user, the apparatus comprising:
one or more computer processors; and
one or more computer-readable mediums collectively including instructions executable by the one or more computer processors to:
acquire information designating, from a set of possible menu items, a plurality of menu items actually included in a meal and further designating measurable characteristics of the plurality of menu items, wherein each of the plurality of menu items is shared by a plurality of users including the user;
generate, based on machine learning using the information as training data, a classification model for classifying a given measurable characteristic as being of a specified menu item from among the plurality of menu items, wherein using the information as training data results in the classification model having a greater degree of accuracy in classifying the plurality of menu items as compared to using an entirety of the set of possible menu items as training data, wherein the classification model includes at least one of a support vector machine and a neural network;
measure, by a first sensor attached to a utensil of the user as the first sensor comes into contact with a respective portion of each menu item of the plurality of menu items as consumed by the user during the meal, at least one measurable characteristic of the respective portion in order to acquire measurement data;
classify, based on the measurement data and the classification model, each consumed portion as being of a respective menu item of the plurality of menu items; and
upon determining that the meal is complete, based on detecting a level of usage of the utensil by a second sensor attached to the utensil, generate, by a processing element of the utensil, dietary advice for the user based on the measurement data and each classified portion, wherein the dietary advice is output to the user.

2. The apparatus according to claim 1, wherein the classifying each portion as a respective menu item includes selecting a menu item having a highest confidence rating among the plurality of menu items as the menu item corresponding to the measurement data.

3. The apparatus according to claim 1, wherein the measurable characteristics include a respective measurable characteristic of each of the plurality of menu items, wherein the respective measurable characteristic is read from a menu item database that stores the respective measurable characteristic for each menu item;
wherein the reading of the measurable characteristic of each of the plurality of menu items includes, for each menu item, reading from the menu item database at least one measurable characteristic that includes a variance based on at least one of an identity of a particular chef, a particular cooking style, and a particular cooking inconsistency; and
wherein the generating the classification model includes performing a learning process to classify food as being of a corresponding menu item, wherein the food is classified based on each of the at least one measurable characteristic of each of the plurality of menu items.

4. The apparatus according to claim 1, wherein the instructions further cause the processor to:
estimate dietary content of the meal of the user, based on time-series data of the measurement data.

5. The apparatus according to claim 1, wherein the instructions further cause the one or more computer processors to:
acquire the measurement data measured by the first sensor attached to the utensil during cooking or after cooking; and
register the measurable characteristic corresponding to the measurement data in a menu item database in association with a new menu item that has not been registered in the menu item database, in response to the measurement data measured by the first sensor attached to the utensil during cooking or after cooking relating to the new menu item.

6. The apparatus according to claim 1, wherein the first sensor includes at least one of a salt concentration sensor, a sugar concentration sensor, a temperature sensor, an electrical resistance sensor, and a warping sensor, wherein the second sensor includes at least one of an acceleration sensor and a gyro sensor.

7. The apparatus of claim 1, wherein the dietary advice comprises a recommended modification to a eating habit of the user, whereafter the recommended modification to the eating habit is adopted by the user;
wherein classifying each consumed portion as being of a respective menu item includes selecting a menu item having a highest confidence rating among the plurality of menu items as the menu item corresponding to the measurement data;
wherein the at least one measurable characteristic includes at least one of salt concentration, sugar concentration, temperature, electrical resistance, warping, and pH, wherein the first and second sensors are of a plurality of types.

8. The apparatus according to claim 7, wherein the measurable characteristics include a respective measurable characteristic of each of the plurality of menu items, wherein the respective measurable characteristic is read from a menu item database that stores the respective measurable characteristic for each menu item;
wherein reading the measurable characteristic of each of the plurality of menu items includes, for each menu item, reading from the menu item database at least one measurable characteristic that includes a variance based on at least one of an identity of a particular chef, a particular cooking style, and a particular cooking inconsistency;

wherein generating the classification model includes performing a learning process to classify food as being of a corresponding menu item, wherein the food is classified based on each of the at least one measurable characteristic of each of the plurality of menu items.

9. The apparatus according to claim 8, wherein the plurality of menu items consist of a subset of available menu items, wherein the classification model is generated based on the subset rather than based on the available menu items;

wherein the classification model includes a support vector machine (SVM) and a neural network, wherein the instructions further cause the processor to estimate dietary content of the meal of the user, based on time-series data of the measurement data, wherein estimating the dietary content of the meal of the user includes estimating an amount of each of salt and sugar ingested by the user.

10. The apparatus according to claim 9, wherein the measurement data includes a measurement value indicating a measurable characteristic and further includes a measurement value indicating an amount of a menu item that has been eaten by the user, as measured by the first sensor during the meal;

wherein the recommended modification is generated by evaluating the dietary content of the meal of the user, wherein the recommended modification specifies an order in which the plurality of menu items should be eaten by the user to attain a specified health benefit.

11. The apparatus according to claim 10, wherein the instructions further cause the one or more computer processors to:

acquire the measurement data measured by the first sensor during cooking or after cooking; and register the measurable characteristic corresponding to the measurement data in the menu item database in association with a new menu item that has not been registered in the menu item database, in response to the measurement data measured by the first sensor during cooking or after cooking relating to the new menu item.

12. The apparatus according to claim 11, wherein the first sensor includes a salt concentration sensor, a sugar concentration sensor, a temperature sensor, an electrical resistance sensor, a pH sensor, and a warping sensor, wherein the second sensor includes an acceleration sensor and a gyro sensor.

13. The apparatus according to claim 12, wherein detecting the level of usage of the utensil comprises detecting that the utensil has been unused for at least a predetermined time period, based on sensor data from the acceleration sensor and the gyro sensor, wherein the utensil comprises a pair of chopsticks used only by the user during the meal.

14. The apparatus according to claim 1, wherein the classification model includes the support vector machine and the neural network.

15. A computer-implemented method of calorie estimation for a user, the computer-implemented method comprising:

acquiring information designating, from a set of possible menu items, a plurality of menu items actually included in a meal and further designating measurable characteristics of the plurality of menu items, wherein each of the plurality of menu items is shared by a plurality of users including the user;

generating, based on machine learning using the information as training data, a classification model for classifying a given measurable characteristic as being of a specified menu item from among the plurality of menu items, wherein using the information as training data results in the classification model having a greater degree of accuracy in classifying the plurality of menu items as compared to using an entirety of the set of possible menu items as training data, wherein the classification model includes at least one of a support vector machine and a neural network;

measuring, by a first sensor attached to a utensil of the user as the first sensor comes into contact with a respective portion of each menu item of the plurality of menu items as consumed by the user during the meal, at least one measurable characteristic of the respective portion in order to acquire measurement data;

classifying, based on the measurement data and the classification model and by operation of one or more computer processors, each consumed portion as being of a respective menu item of the plurality of menu items; and upon determining that the meal is complete, based on detecting a level of usage of the utensil by a second sensor attached to the utensil, generating, by a processing element of the utensil, dietary advice for the user based on the measurement data and each classified portion, wherein the dietary advice is output to the user.

16. The computer-implemented method according to claim 15, wherein the classifying each portion as a respective menu item includes selecting a menu item having a highest confidence rating among the plurality of menu items as the menu item corresponding to the measurement data.

17. The computer-implemented method according to claim 15, wherein acquiring the information includes, for each menu item, reading from a menu item database at least one measurable characteristic that includes a variance based on at least one of an identity of a particular chef, a particular cooking style, and a particular cooking inconsistency, and the generating the classification model includes performing a learning process to classify food as being of a corresponding menu item, wherein the food is classified based on each of the at least one measurable characteristic of each of the plurality of menu items.

18. A computer program product comprising a computer-readable storage medium having program instructions embodied therewith for calorie estimation for a user, the program instructions executable to:

acquire information designating, from a set of possible menu items, a plurality of menu items actually included in a meal and further designating measurable characteristics of the plurality of menu items, wherein each of the plurality of menu items is shared by a plurality of users including the user;

generate, based on machine learning using the information as training data, a classification model for classifying a given measurable characteristic as being of a specified menu item from among the plurality of menu items, wherein using the information as training data results in the classification model having a greater degree of accuracy in classifying the plurality of menu items as compared to using an entirety of the set of possible menu items as training data, wherein the classification model includes at least one of a support vector machine and a neural network;

measure, by a first sensor attached to a utensil of the user as the first sensor comes into contact with a respective portion of each menu item of the plurality of menu items as consumed by the user during the meal, at least one measurable characteristic of the respective portion in order to acquire measurement data;

classify, based on the measurement data and the classification model and by operation of one or more computer processors when executing the program instructions, each consumed portion as being of a respective menu item of the plurality of menu items; and upon determining that the meal is complete, based on detecting a level of usage of the utensil by a second sensor attached to the utensil, generate, by a processing element of the utensil, dietary advice for the user based on the measurement data and each classified portion, wherein the dietary advice is output.

19. The computer program product according to claim 18, wherein the classifying each portion as a respective menu item includes selecting a menu item having a highest confidence rating among the plurality of menu items as the menu item corresponding to the measurement data.

20. The computer program product according to claim 18, wherein the measurable characteristics include a respective measurable characteristic of each of the plurality of menu items, wherein the respective measurable characteristic is read from a menu item database that stores the respective measurable characteristic for each menu item;

wherein acquiring the information includes, for each menu item, reading from the menu item database at least one measurable characteristic that includes a variance based on at least one of an identity of a particular chef, a particular cooking style, and a particular cooking inconsistency; and wherein the generating the classification model includes performing a learning process to classify food as being of a corresponding menu item, wherein the food is classified based on each of the at least one measurable characteristic of each of the plurality of menu items.

* * * * *